Patented Dec. 10, 1940

2,224,815

UNITED STATES PATENT OFFICE 2,224,815

SILICA RESINS AND METHOD OF MANUFACTURE

Eustace Glycofrides, Philadelphia, Pa., assignor to Owens-Illinois Glass Company, a corporation of Ohio No Drawing. Application March 13, 1937, Serial No. 130,679

4 Claims. (Cl. 260—37)

The present invention is a silica resin and includes methods of manufacturing the same; and more particularly is a synthetic resin made from various silica or silica bearing substances such as silicic acid, orthosilicate, sodium silicate, or the like; and aldehyde resin producing substances such as an aldehyde, urea formaldehyde, phenol formaldehyde or their derivatives or equivalents or the like.

It is an object of the invention to provide a synthetic resin having superior physical and chemical properties by incorporating both organic and inorganic substances, to the end of utilizing or combining their individual inherent properties; and in particular resins incorporating, if desired, large amounts of silica to the end of increasing the strength, moisture resistance, fire-proof qualities, hardness, chemical resistance, etc. of the mass as a whole.

Another object of the invention is to provide a synthetic resin composed in part of silica having transparency and, if desired, a high index of refraction.

A further object of the invention is to provide a synthetic resin composed of extremely cheap raw materials including raw silica, silicic acid or sodium silicate or other silicon or silica bearing compounds which are much cheaper than the usual organic resin ingredients.

A further object of the invention is to provide a transparent glass-like material, if desired, having sufficient flexibility to withstand shock and impact much better than ordinary glass; and to provide a material which, when fractured or broken, will have individual edges which will not be sharp and serrated and knife-like such as broken edges of glass which are dangerous to life and limb. It is also desired to provide a product having a much lighter density than glass so that flying fragments of the material will not possess the same inertia and cutting effects as flying glass fragments.

Still another object of the invention is to provide a synthetic resin which is capable of being worked easily and which can be subjected to all of the various machining operations including turning, drilling, sawing, polishing, grinding, chiseling, and which can be readily fabricated into articles such as container caps, dishes, sheet or plate materials, and novelty articles of infinite variety as found in commerce and industry. Another object of the invention is to provide a synthetic resin which may be molded, as, for example, under heat and pressure, into any of the desired shapes normally found for molded articles.

Another object of the invention is to provide an improved process for resinifying a silica bearing substance with an organic substance such as urea formaldehyde or phenol formaldehyde, or their derivatives or equivalents, for producing synthetic resins of a character described hereinabove, on a commercial and industrial scale, and in an economical and practical manner.

Other objects and advantages of the invention will become apparent from the following description.

Broadly stated, my invention contemplates reacting silica with aldehyde substances capable of forming resins such as formaldehyde, phenol formaldehyde or urea formaldehyde, or their derivatives or equivalents, in such a manner as to incorporate the silica therein in such amounts as, for example, from a fraction of a percent to about sixty-five percent silica. I have found the most favorable medium of the silica for incorporating the latter into the aldehyde, phenol formaldehyde or urea formaldehyde, to be silicic acid or orthosilicate. The silica may also be added in other mediums such as finely divided silica, sodium silicate, silicon tetrachloride, etc.

When the silica bearing compound is in the form of a solid or powder, such as silicic acid or silica, it is preferable to add it in as finely divided or ground condition as possible. The use of extremely finely divided particles permits a greater clarity and transparency of the finished product even though a large amount of silica may be added to the organic material. Silica having extremely fine pores may be prepared from a silica gel to which alcohol has been added to substitute for the water and then the mass gently heated to drive off the water and alcohol, leaving an extremely light product. The pore size of such a product may be submicroscopic and be of the order of magnitude in the range of only several angstroms to the wave length of light.

The process also involves regulation of the pH value of the solution, the temperatures, degree of agitation, pressures, and other conditions throughout the process, in order to control the extent of combination of the silica with the organic material, the viscosity of the solution and the rate of reaction, condensation and/or polymerization thereof.

The reaction of the silica with the organic material generally takes place most effectively in a substantially neutral or slightly acid solution, or one whose pH value lies in a range from about 5 to 8 and preferably about 7. The temperatures and pressures during the action may be varied in accordance with the type of silica bearing compound which is to be reacted with the organic material, as will be brought out more fully hereinafter. In order to render the solution sufficiently neutral or alkaline for an efficient reaction, it may be necessary to add relatively small amounts of basic materials such as caustic soda, triethanolamine or the like. Various plasticizers known in the art may also be added as, for example, ethylene glycol, castor oil, diethylene glycol or its isomers or equivalents thereof, or the like.

After the reaction has been completed or substantially completed between the silica and the organic material, the pH may be lowered to about 3 or 4 in order to hasten the polymerization and setting of the mass. To this end, I preferably add to the reaction mass a substance having the dual function of a neutralizer and a clarifier; and for these purposes I preferably add lactic acid or other acids or isomers or their equivalents and preferably such compounds which remain stable throughout the reaction. Other acids which may be successfully added are, for example, formic acid, citric acid, acetic acid, hydrochloric acid, sulphuric acid, etc., or the like.

After the addition of the aforementioned acids or equivalent substitutes, the resinous mass may be subjected to the further application of heat in the open or in the presence of a vacuum. The presence of a vacuum may assist in the elimination of water, bubbles or other gases which may effervesce or be evolved, and assist in the production of a clear solid mass. It may be desirable to add a plasticizer after the neutralization in order to regulate the plasticity of the resins under treatment and curage. Examples of these again are ethylene glycol, dibutyl phthalate, castor oil, glycerin, monoethylene glycol, diethylene glycol, triethylene glycol or their isomers or equivalents. In practice it is preferred to add a substance having the properties of both plasticizing and neutralizing the reaction mass. The resin may then be cast or molded and the material subjected to further heat until the resin completely sets or hardens or polymerizes to form a solid, hard mass.

Upon hardening and setting of the resin, the latter may be removed from the mold in any suitable manner, after which the resin is in condition ready for use in the fabrication and manufacture of various articles of commerce and industry.

For a better understanding of the invention, the following more specific examples are given solely for the purpose of illustration, it being understood that the specific substances, temperatures, concentrations, pressures and the like, which I have given, are not to be considered as a limitation upon the invention, nor is the invention to be limited thereto, but it is to be construed in the light and spirit of the appended claims.

When preparing a silica resin from sodium silicate or a solution thereof, I preferably mix a solution thereof with a solution of urea or phenol, or its equivalents or derivatives such as methyl, ethyl, methylene, ethylene, methyl acetyl, alpha diethyl, or thiethyl urea, furfural, thiourea or its derivatives, cyanamid, dicyanamid, or ammonium thiocyanate; in formaldehyde or its equivalents or derivatives, such as para-formaldehyde, meta-formaldehyde, hexamethylenetetramine, trimethylenetetramine.

When these ingredients are first intermixed with each other, the mass is rather gelatinous. However, as they are intermixed for a certain period of time, the solution gradually clears and becomes thin, during which time an exothermic action may take place. This reaction product may then be set in a pan to dry to complete the reaction. Amorphous cakes are produced which may be ground up into a powder. These are insoluble in water, with the exception of the sodium compound therein, which produces a pH of about 8–10. In this reaction, an intermediate product such as silica methylol urea, or silica dimethylol urea or intermediate products of phenol, or the like, may be produced. An aqueous dispersion of this powder and the solution of sodium compound thereof may then be neutralized to a pH of 7 to 6.5 with hydrochloric acid or the like, the mass stirred and then filtered to remove the intermediate product of silica resin. This intermediate product in the form of a powder may then be heated to about 125° to 145° C., the pH reduced to about 3 or 4 by the addition of a suitable acid such as lactic acid, its polymers or its equivalents, and then the mass may be cast into a suitable form. The addition of the acid causes polymerization to rapidly set in to solidify the mass.

It is also possible to take the reaction product of sodium silicate and organic resin material in the form of a powder, add an acid to neutralize and apply heat, which causes the mass to return into a gel. Again the pH may be lowered to about 3 to 4 with a suitable acid such as lactic acid, and then cast. In this case the sodium salt remains in the resin, but it has been found that it does not impair the transparency of the material. Small amounts of plasticizer, such as diethylene glycol, etc., may be intermixed with the mass before being cast.

The presence of sodium or other alkali in the process is generally objectionable owing to its hygroscopic properties, and in order to remove the same during the process considerable extra manipulation and time are required. Accordingly, I preferably use a silica bearing compound which is free from alkali, and as an example of such compound I preferably use an orthosilicate in finely divided form or extremely finely divided silica.

In using such silica ingredients, I intermix any desired quantities with a solution of urea or phenol or its derivatives or equivalents, in formaldehyde or its equivalents or derivatives. This solution is then preferably neutralized with a suitable base such as triethanolamine and then stirred at an elevated temperature of 125° C. for about fifteen minutes, more or less, as indicated by the temperature, until the end point is reached. The pH is then lowered to about 3–4 by the admixture of a small amount of acid which may cause an effervescing and initiate polymerization. Vacuum is preferably applied to assist in the removal of water and excess aldehydes, after which the material may be cast.

In all the examples the curing process is substantially the same. The poured or molded resin is heated to a temperature below the boiling point of water, preferably about 76° C. to 100° C., for a period sufficient to harden the resin. This time varies generally from about twelve hours to about two hundred hours, the higher the temperature above 82° C., the shorter being the time to polymerize and solidify the resin. It is possible to halt curing at an early stage, powder the mass and use the same as a molding powder.

If desired, these resins, especially those which are colorless, may be tinted or colored when in a liquid state with practically any tints or shades, and may be made to resemble precious stones, semi-precious stones, minerals, and natural products. For example, it is possible to add innumerable dyes and pigments such as the aniline dyes.

I shall now set forth certain specific examples illustrative of, although not limiting the present invention, the purpose being to assist in elucidating and clarifying the present invention, and to permit those skilled in the art to practice the same.

*Example 1*

Prepare a solution of phenol in formaldehyde, the proportions being about one molecule of phenol to about one and one-half molecules of formaldehyde solution (these proportions being widely variable, however). An excess of formaldehyde is generally preferable in order to insure a more complete and swift reaction. To this solution may be added silicic acid, preferably in extremely finely divided form, in proportions of a fraction of a percent to about 65 percent by weight of silicic acid to phenol formaldehyde. This mixture should then be agitated and the pH adjusted to about neutral, or between 7 and 6 pH, by the admixture of any suitable material, preferably triethanolamine, or its isomers or equivalents, as pointed out hereinabove.

After the adjustment of the pH of the mixture of silica phenol formaldehyde, the entire mass should be heated for a period of about one-fourth of an hour to about three hours, preferably under a reflux condenser, to complete the reaction. In general, the higher the pH value, the longer will this period be. The temperature of the heating is generally about 125° C. to 140° C. When the end point is reached, the pH value of the mixture may then be lowered to a point between 3 or 4 pH, with a suitable acid such as lactic acid or its isomers or equivalents, and a vacuum applied. The application of vacuum has a tendency to withdraw or suck off the water and gases evolved in the reacting mass. It is also possible to use an open evaporating pan to completely dehydrate the material with the assistance of stirring and slow heat.

After the resin has been practically dehydrated, it can then be poured or cast in a liquid condition into open molds. The molds containing the resins should be placed in driers or curers which are maintained under a relatively low heat, at a temperature preferably below the boiling point of water. The application of relatively low heat is continuous until the resin completes its polymerization and sets to a hardened, stable solid. This product may be strong, hard, resilient and transparent. The form of the orthosilicate affects the transparency of the finished article. With relatively low percentages of silica, say, below 4% or 5%, the form of the silica is not important, as a clear, bright mass will be produced anyhow, but with larger amounts, the silica should preferably be in extremely finely divided form.

The hardness of the resin may be raised by the curing operation, and it may be broadly stated that the more complete the polymerization, the harder will be the resins.

*Example 2*

A silica urea formaldehyde resin may be prepared by following the same procedure outlined in Example 1 with the exception of the admixture of urea in place of the phenol.

*Example 3*

Sodium silicate, urea and formaldehyde solution may be compounded in the ultimate proportion of about 175 grams of commercial sodium silicate to 30 to 40 grams of urea, and about 100 grams of aqueous 40% commercial formaldehyde solution. In the compounding of this mixture the pH is preferably adjusted to about neutral by the admixture of any suitable substance. After the mass has been compounded it may be permitted to stand for several days, or if a slow heat is applied, it may stand for several hours, whereupon an amorphous product is separated out and the mass dried. Before proceeding further, this amorphous product is preferably ground up as finely as possible, whereupon the next step is to remove the sodium compound, which may be done by washing the powdered amorphous material in water and neutralizing the sodium compound with a suitable acid such as hydrochloric acid. The undissolved material may be filtered out and washed until there are no traces of chloride as tested by the silver nitrate in the wash water. The filtered and washed product may then be dried.

This dry powder may now be remelted with a plasticizer such as diethylene glycol, etc., and the pH adjusted to between 3 or 4, after which it may be poured or cast in a liquid condition into open molds. The molds containing the resins are placed into suitable curing apparatus which is maintained under a relatively low heat as, for example, a temperature below the boiling point of water. The application of low heat is maintained until the resin completes its polymerization and sets to a hardened, stable solid.

*Example 4*

A silica phenol formaldehyde resin may be prepared by following the same procedure as set out in Example 3, with the exception of substitution of phenol for the urea.

*Example 5*

Products similar to those produced under Examples 1 and 2 may be made by using finely divided silica, and preferably a silica fluff having particle sizes of the order of magnitude of a few angstroms to microscopic sizes, in substitution of the silicic acid.

I claim:

1. The process of producing a silica resin which comprises combining silicic acid, phenol and formaldehyde, adjusting the pH of said mixture to about neutral, heating the said mass under a reflux condenser until an end point is about reached, adjusting the pH of said reaction mass to about 3 to 6, applying a vacuum to said mass to assist in the removal of water, casting the mass, and then curing the same to harden with the silica component of said silicic acid distributed throughout said mass.

2. The product produced by the process as called for in claim 4.

3. The process of producing a silica resin which comprises intermixing silicic acid with phenol and formaldehyde, adjusting the pH to about neutral, causing a reaction to continue to an end point, acidifying the mass to initiate a polymerization thereof, casting the same, and curing the same to a solid mass with the silica component dispersed throughout the resin.

4. The process which comprises reacting silicic acid with an aldehyde solution of a compound chosen from the group consisting of ureas and phenols, at a pH of about neutral, and near the end point of the reaction acidifying the reaction mass to initiate polymerization thereof, casting said reaction mass, and curing the same to a solid, hard mass with the silica component dispersed throughout the resin.

EUSTACE GLYCOFRIDES.